Jan. 7, 1930.  E. R. LAVENDER  1,742,401
DISK FOR HARROWS
Filed June 30, 1927

Witnesses
F. E. Radman

Ellis R. Lavender. INVENTOR.
BY Richard B. Owen.
ATTORNEYS.

Patented Jan. 7, 1930

1,742,401

UNITED STATES PATENT OFFICE

ELLIS R. LAVENDER, OF RALPH, ALABAMA

DISK FOR HARROWS

Application filed June 30, 1927. Serial No. 202,715.

This invention relates to earth working implements and pertains particularly to an improved harrow disk structure and mounting therefor.

The primary object of the present invention is to provide, in a manner as hereinafter set forth, a harrow disk designed to replace the teeth of a toothed harrow and adapted to be adjustably fixed to the harrow frame, to vary the degree of penetration of the disks into the earth.

Another object of the present invention is to provide, in a manner as hereinafter set forth, an improved type of mounting for a disk of the character embodying the present invention.

Numerous other objects and advantages of the present invention will become apparent as the description of the same proceeds and the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claim.

Figure 1:
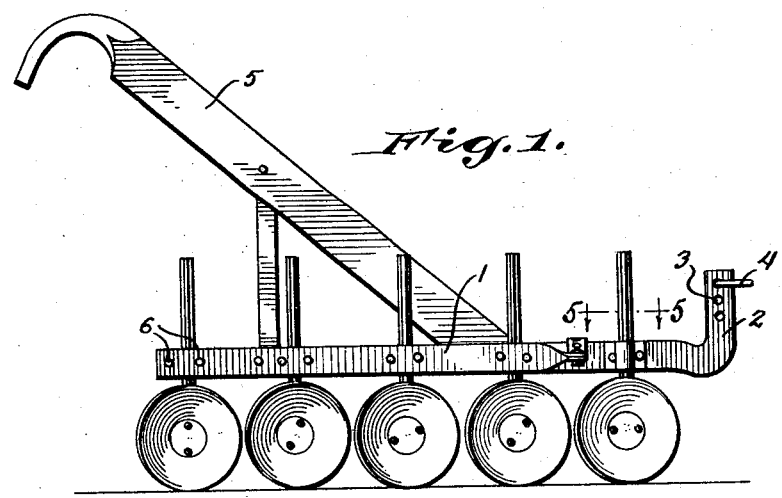
Figure 1 shows in side elevation, a harrow or cultivator equipped with the disk structures of the character embodying the present invention.
Figure 2:
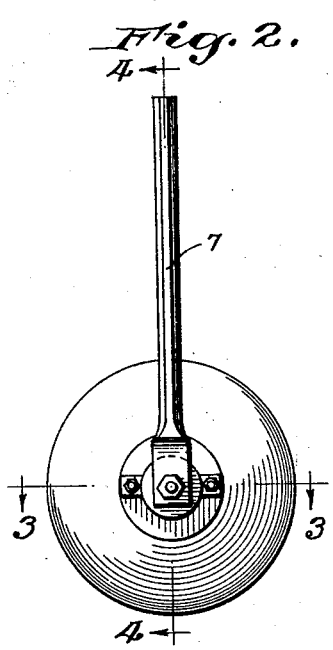
Figure 2 shows one of the disks and supporting standards in side elevation.
Figure 5:
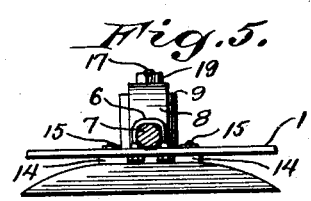
Figure 5 is a section taken substantially upon the line 5—5 of Figure 1.

Referring now to the drawing in detail, wherein like numerals indicate corresponding parts throughout the several views, the numeral 1 indicates generally a cultivator frame of any conventional design, the forward end of which is turned upwardly as indicated at 2 and provided with the apertures 3 for the engagement therewith of a clevis 4 by means of which the cultivator may be attached to a tractor or have a horse hitched thereto to draw the implement over the ground. As is well known, cultivator frames of this character are usually of substantially triangular configuration the upright member 2 being arranged at the apex of the frame which forms the forward portions thereof. A pair of control handles 5 are carried by the frame and project upwardly and rearwardly therefrom so that a walking attendant can control the direction of travel of the cultivator.

The side beams of the frame structure 1 are provided with a plurality of U-bolts 6 which normally act to clamp cultivator teeth in position on the frame. The usual cultivator teeth of a harrow of this character are removed for the application of the disk structure embodying the present invention and the manner in which this disk structure is attached to the frame will be described in detail hereinafter.

Figure 4:
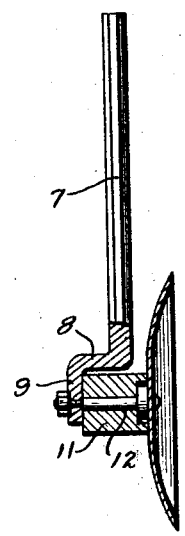
Figure 4 is a longitudinal section taken substantially upon the line 4—4 of Figure 2.

The present structure comprises an elongated shank 11, preferably of octagonal cross sectional design and having the lower end thereof flattened and turned at right angles to the main body portion as indicated at 8 and terminating in the downwardly extending flattened portion 9 which is in off-set substantially parallel relation to the shank 7 as clearly shown in Figure 4. The terminal end portion 9 of the shank is provided with an aperture 10 and abutting the inner face of this terminal portion is a cylindrical hub body 11 through the center of which a bore 12 is formed, the forward end of the hub body having the pocket 13 formed therein into the center of which pocket the bore 12 opens.

Figure 3:
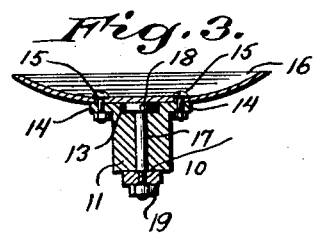
Figure 3 is a transverse section taken substantially upon the line 3—3 of Figure 2.

The hub body 11 has projecting laterally therefrom at diametrically opposite points and at the forward end thereof, the ears 14 which are apertured as shown in Figure 3 for the reception of the disk securing bolts 15. A disk body 16 is positioned with the back thereof against the forward end of the hub 11 and the bolts 15 are passed through appropriate apertures in the disk and through the ears 14 to secure the disk in position against the end of the hub as shown.

Before attaching the disk 16 to the end of the hub 11 a pivot bolt 17 is passed through the hub from the forward end thereof, the head 18 of this bolt positioning in the pocket or recess 13. The opposite end of the bolt passes through the aperture 10 in the terminal end portion 9 of the shank and receives a nut 19 which secures the bolt and consequently the hub to the shank. As is clearly shown in Figure 4, the shank 7 lies directly above the hub 11.

When placing the devices embodying the present invention, in position on the frame structure 1 of the cultivator, the usual cultivator teeth, (not shown) are removed from the U-bolts 6 and the shank 7 of the present invention extended through these U-bolts and the bolts tightened up to secure the shank against the frame 1. Due to the provision of a shank of polygonal cross sectional design, the same may be axially rotated and held in any set position to maintain the disks 16 at any desired angle with respect to the path of travel of the cultivator, thus controlling the degree of penetration of the disks.

Having thus described my invention, what I claim is:

In a device of the class described, a shank including an elongated straight body portion, a laterally extending arm disposed on the lower end of the body portion, and a depending flattened attaching foot on the arm disposed in substantial parallel relation to the body, a pivot bolt secured to the foot and arranged in substantial parallel relation to the arm with its head disposed outermost, a hub rotatably mounted on the bolt having its inner end engaging the foot and its outer end recessed for receiving the head of the bolt, radially extending ears formed on the outer end of the hub, and a cultivator disk having its face placed in engagement with the outer end of the hub for closing said recess, and retaining bolts extending through the disk and said ears.

In testimony whereof I affix my signature.

ELLIS R. LAVENDER.